US006446574B2

(12) United States Patent  (10) Patent No.: US 6,446,574 B2
Bickley                    (45) Date of Patent:     Sep. 10, 2002

(54) ANIMAL-ACTUATED FEEDER

(76) Inventor: Robert Henry Bickley, 8315 N. Charles Dr., Paradise Valley, AZ (US) 85253

(*) Notice: Subject to any disclaimer, the term of this patent is extended or adjusted under 35 U.S.C. 154(b) by 0 days.

(21) Appl. No.: 09/784,377

(22) Filed: Feb. 15, 2001

Related U.S. Application Data

(60) Provisional application No. 60/183,956, filed on Feb. 22, 2000.

(51) Int. Cl.[7] .......................... A01K 1/10; A01K 39/00
(52) U.S. Cl. ............................................. 119/55; 119/62
(58) Field of Search ..................... 119/51.02, 51.12, 119/54, 55, 61, 62, 63

(56) References Cited

U.S. PATENT DOCUMENTS

| 3,121,419 A | * | 2/1964 | Gillespie ................ 119/62 |
| 3,301,219 A | * | 1/1967 | Hellekson ............... 119/55 |
| 3,575,141 A |   | 4/1971 | Elkins .................. 119/55 |
| 3,599,608 A |   | 8/1971 | Esquival ............... 119/51.12 |
| 3,631,840 A |   | 1/1972 | McCormack ............ 119/51.12 |
| 3,648,660 A |   | 3/1972 | Esquival ............... 119/51.11 |
| 3,763,825 A |   | 10/1973 | Fleming ............... 119/51.12 |
| 3,785,348 A |   | 1/1974 | Polidori, Sr. et al. ..... 119/62 |
| 3,884,189 A |   | 5/1975 | Ruth .................. 119/51.13 |
| 3,935,837 A |   | 2/1976 | Mulhern ............... 119/51.12 |
| 3,942,478 A |   | 3/1976 | Lane .................. 119/51.12 |
| 3,946,702 A |   | 3/1976 | Mazzini ............... 119/51.13 |
| 3,982,501 A |   | 9/1976 | Marzocco .............. 119/51.14 |
| 4,022,263 A |   | 5/1977 | Beckett et al. .......... 160/92 |
| 4,128,080 A |   | 12/1978 | Haney ................ 119/51.5 |
| 4,162,683 A |   | 7/1979 | Brooks ................ 119/51 R |
| 4,175,516 A | * | 11/1979 | Savage ................ 119/62 |
| 4,216,743 A |   | 8/1980 | Cohen ................. 119/19 |
| 4,248,175 A |   | 2/1981 | Navarro ............... 119/51.12 |
| 4,256,054 A |   | 3/1981 | Hitchcock ............. 119/51.11 |
| 4,263,876 A |   | 4/1981 | Scott ................. 119/62 |
| 4,357,905 A |   | 11/1982 | Carpenter ............. 119/61 |
| 4,399,772 A |   | 8/1983 | Salinas ............... 119/51.5 |
| 4,421,059 A |   | 12/1983 | Cousino .............. 119/51.12 |
| 4,461,241 A | * | 7/1984 | Ostler ................ 119/51.02 |
| 4,505,228 A |   | 3/1985 | Scott ................. 119/62 |
| 4,522,152 A |   | 6/1985 | Meyer ................ 119/56 R |
| 4,572,108 A |   | 2/1986 | Daifotes .............. 119/51 R |
| 4,644,903 A |   | 2/1987 | Shaver ................ 119/51 R |
| 4,671,210 A |   | 6/1987 | Robinson et al. ........ 119/51.12 |
| 4,733,634 A |   | 3/1988 | Hooser ............... 119/51.12 |
| 4,771,735 A |   | 9/1988 | Larsen ............... 119/62 |
| 4,782,790 A |   | 11/1988 | Batson ............... 119/51.11 |
| 4,860,691 A |   | 8/1989 | Mayer ................ 119/51.5 |
| 4,953,506 A |   | 9/1990 | Sanders .............. 119/61 |
| 4,966,099 A |   | 10/1990 | Arney ................ 119/61 |
| 4,981,106 A |   | 1/1991 | Nagatomo ............ 119/51.11 |
| 5,048,463 A |   | 9/1991 | Wilson et al. .......... 119/163 |
| 5,165,365 A |   | 11/1992 | Thompson ............ 119/61 |
| 5,176,103 A |   | 1/1993 | Reid et al. ............ 119/51.13 |
| 5,222,461 A |   | 6/1993 | Haynes ............... 119/62 |
| 5,245,948 A |   | 9/1993 | McClellan ............ 119/51.5 |

(List continued on next page.)

Primary Examiner—Charles T. Jordan
Assistant Examiner—Elizabeth Shaw
(74) Attorney, Agent, or Firm—Lowell W. Gresham; Meschkow & Gresham, PLC

(57) ABSTRACT

An animal-actuated feeder (20) has a treadle (26) to be tread upon by an animal (36) desirous of obtaining food, a food compartment (24), a cover (30) with closed and open positions (32, 34) denying and granting access to the compartment (24), and linkage (28) to open the cover (30) when the animal (36) treads upon the treadle (26). A damper (88) is coupled to the cover (30) and dampens transit between open and closed positions (32, 34). A dish (106) having a mating lid (108) coupled to the cover (30) promotes the retention of the food in a palatable condition. A plurality of moat assemblies (118) serve as legs for the feeder (20) and inhibit crawling arthropods from gaining access to the food. A control unit (154) and latch (152) control the opening of the cover (30) in response to a tag unit (162) worn by the animal (36) treading upon the treadle (26).

35 Claims, 10 Drawing Sheets

U.S. PATENT DOCUMENTS

| | | | |
|---|---|---|---|
| 5,265,560 A | 11/1993 | Dobbins | 119/51.12 |
| 5,349,925 A | 9/1994 | Zerato et al. | 119/62 |
| 5,365,879 A * | 11/1994 | Ying-Kuan | 119/54 |
| 5,377,620 A | 1/1995 | Phillippi | 119/51.12 |
| 5,398,643 A | 3/1995 | McElrath et al. | 119/51.11 |
| 5,404,838 A | 4/1995 | Khan | 119/52 |
| 5,430,441 A | 7/1995 | Bickley et al. | 340/825.54 |
| D362,090 S | 9/1995 | Baldwin et al. | D30/130 |
| 5,467,735 A | 11/1995 | Chrisco | 119/51.5 |
| 5,613,464 A | 3/1997 | Petzel | 119/55 |
| 5,619,952 A | 4/1997 | Walker | 119/61 |
| 5,701,702 A | 12/1997 | Reid et al. | 49/169 |
| 5,724,914 A | 3/1998 | Nemeth | 119/61 |
| 5,730,082 A | 3/1998 | Newman | 119/51.5 |
| 5,730,083 A | 3/1998 | Walker | 119/61 |
| 5,735,231 A | 4/1998 | Terenzi | 119/51.11 |
| 5,794,560 A | 8/1998 | Terenzi | 119/51.11 |
| 5,813,364 A | 9/1998 | Harrisson | 119/501 |
| 5,857,428 A | 1/1999 | Gitzen | 119/61 |
| 5,970,912 A | 10/1999 | Supple et al. | 119/51.11 |
| 5,996,531 A * | 12/1999 | Anderson | 119/61 |
| 6,044,795 A * | 4/2000 | Matsuura et al. | 119/51.12 |
| 6,062,166 A | 5/2000 | Macrina | 119/51.11 |
| 6,141,911 A | 11/2000 | Reid | |
| 6,142,099 A | 11/2000 | Lange, Jr. | 119/51.5 |

* cited by examiner

ANIMAL-ACTUATED FEEDER

RELATED INVENTION

The present invention claims priority under 35 U.S.C. §1119(e) to: "Pet Feeder with Covered Food Enclosure," Provisional U.S. Patent application Ser. No. 60/183,956, filed Feb. 22, 2000, which is incorporated by reference herein.

TECHNICAL FIELD OF THE INVENTION

The present invention relates to the field of animal feeders. More specifically, the present invention relates to the field of small animal feeders actuated by the animal.

BACKGROUND OF THE INVENTION

Animals typically prefer food that is in a palatable condition, i.e., dry food that is not stale and moist food that has not dried out. When feeding animals, therefore, it is desirable to use a feeder that does not expose the food for prolonged periods. This poses a problem for most feeding dishes and other exposed feeders. Being exposed, the food becomes stale or dried out and is not consumed. Such uneaten food is typically discarded, representing an undesirable expense to the owner and a loss of nutrition to the animal.

Additionally, a wide variety of creatures find animal foods desirable. Some of the most bothersome are birds, toads, rabbits, squirrels, rats, mice, and other small vertebrates. Such creatures may spoil the food, scatter the food, and soil the food and nearby areas with droppings. The persistent efforts of these creatures to steal animal food may pose a loss of food and a source for the spread of disease.

Additionally, the presence of animal food often attracts invertebrate pests, typically spiders, scorpions, flies, ants, beetles, sow bugs, pill bugs, and other arthropods. These unwanted pests may directly infest the food, as with a swarm of ants, or lay eggs and infest the food with their larvae, as with flies. These pests consume food intended for the animal(s), may contaminate or scatter the food, and may contribute to the spread of disease. A significant problem is therefore posed by feeders that do not adequately exclude both vertebrate and invertebrate pests.

Furthermore, when the animals are fed indoors, as with pets, the presence of the food may contribute to an invasion of the home by mice, ants, and other pests, thereby bringing infestation, contamination, disease, and esthetic problems into the home.

Toddlers and babies may gain access to the feeding locations. They are often curious about the food and may ingest and/or scatter the food. The problems of contamination and disease are therefore increased when small children are present.

Additionally, animal foods, especially moist (canned) animal foods, often have distinctive odors that may be unpleasant to nearby humans. The noisome dissemination of such odors is often a problem in and of itself.

Infestation by crawling arthropods, typically ants, is a common problem. While sealing the food dish or feeder to prevent the dissemination of odors significantly reduces such infestations, it does not eliminate them. A barrier approach, such as a moat, is often used to inhibit such infestation. The use of a moat or similar barrier, however effective, poses additional problems. Moats are typically filled with water, which provide a reasonable barrier. Many species of ants, however, can swim. Almost all ants and similar crawling arthropod can be supported by the surface tension of the water. Some species of ant may form bridges of their comrades to access a food source. To be effective, therefore, a moat must either be wide enough to inhibit swimming and/or bridging, or contain a barrier other than water.

Impregnating moat water with a few drops of a surfactant, e.g., a detergent, tends to destroy the surface tension of the water. This causes ants or other crawling arthropods to sink and drown, thereby effectively inhibiting swimming and/or bridging of the moat. A problem exists, however, in that in conventional feeders with moats, the moat medium is typically accessible to the animal. This allows the animal to consume the moat water. This empties the moat and defeats its ability to inhibit crawling arthropods and other pests. Also, if the moat water is impregnated with a surfactant, consumption by the animal may lead to indigestion, diarrhea, or even death.

Another problem with moats and similar liquid-filled barriers are the ease of splashing and spillage when full. This makes it difficult to transport a feeder with a full moat. A moat often spills as the feeder is carried from the sink, where the moat is filled, to the feeding area. Also, a full moat may splash and spill should the animal exhibit excessive enthusiasm while eating.

The use of a closed or sealed food container in a feeder intended for pets or other small animals poses the problem of access to the food by the animal. Some conventional animal feeders utilize a mechanical or electrical/electronic mechanism to open the feeder at a predetermined time or other predetermined event. With such a feeder, the animal is denied access until after the predetermined time or event. Once opened, however, the feeder remains open until reset, i.e., reloaded with food and closed, by the owner. That is, if the animal is not present or does not desire to eat at the predetermined time or event, the food container is opened and the food is made available and inviting to pests.

Some feeders remain closed until the presence of an animal is detected. That presence triggers a mechanism to open the container and grant access to the food. Typically, these feeders open upon detecting the weight of the animal, upon interruption of a light beam, upon detection of proximate motion, etc. However, such triggering methods are unable to adequately detect the presence of a specific animal. For example, a large squirrel may open a feeder intended for a cat.

Alternatively, some conventional feeders remain closed until the presence of a specific desired animal is detected. Such feeders may inhibit access by pests by requiring that the animal have a trigger, such as a magnetic tag or an electronic collar, before the feeder will grant access. Again, however, a problem exists in that many such feeders, once opened, remain open until reset by the owner. Therefore, if the animal fails to consume all the food in the container immediately upon gaining access, the remaining food is made available to pests.

Few conventional feeders limit feeding to one specific animal. For example, if a feeder for a pet cat is to be located upon an open patio, it is normally desirable to bar the neighbor's cat from also being granted access to the food. To accomplish this, the animal may wear a collar having an electronic device that triggers the feeder only when that device (i.e., the animal) is proximate. Unfortunately, such devices are active. That is, such devices typically transmit a signal that is received by the feeder. This poses the problems of size, cost, reliability, and maintenance of the active device. Having both circuitry and a power source (i.e., a battery) to operate the circuitry, the devices are relatively large. Most often, the devices are attached to a collar, making the collar stiff, bulky, and uncomfortable, especially for small animals. Such devices are also expensive, in that the circuitry, the battery, and the housing therefor are complex. Additionally, the risk of loss is high, especially if the animal is a cat (cats being notorious for wriggling out of collars). The battery for the device must be replaced often, adding to the cost and maintenance of the device. Finally, the battery compartment provides the possibility of the introduction of water and other contaminants that may corrode, short, or otherwise damage the circuitry and/or the battery.

Even with the bulky and less than ideal electronic triggers discussed hereinbefore, it is not readily feasible with conventional controlled feeders to feed multiple animals in a single environment where differing animals have differing food requirements. For example, if one pet in a multi-pet household requires a special (e.g., medicated) diet, it is desirable to bar the other pets in the household from that pet's food while barring that pet from the other pets' food.

Some animals, such at cats and some small dogs, desire a calm, non-intimidating environment in which to eat. Covered or sealed feeders typically have a spring-action lid. Such a lid may pop open quickly. This may be interpreted by a shy or nervous animal as a threat. This is especially so in the case of cats, which generally dislike quick motions proximate their faces. It is a problem that feeders having a hinged cover that opens quickly and swings towards the animal's face during at least a part of its opening path may inhibit an animal's desire to eat from that feeder.

It is also a problem that the rapid opening and/or closing of a feeder may be accompanied by loud or sharp noises disturbing to some animals.

It is a problem that many feeders have integrated food dishes and are therefore unsuitable for use with moist or semi-moist foods. Such an integrated dish increases the difficulty of filling and cleaning the feeder. This in turn inhibits cleanliness and promotes exposure to disease.

Feeding a pet or other animal on a schedule coincident with the pet's needs or desires poses a problem. Pet owners sometimes wish to provide their pet with enough food for several days. Feeders having large capacity dry food reservoirs that automatically dispense food, unfortunately, do not protect the food from pests and maintain the food in a palatable condition for the requisite time. The problems of infestation, contamination, and spoilage therefore remain.

SUMMARY OF THE INVENTION

Accordingly, it is an advantage of the present invention that an animal-actuated feeder is provided.

It is another advantage of the present invention that an animal-actuated feeder is provided that has a food compartment cover that opens and closes in a non-intimidating manner in response to an animal treading upon a treadle.

It is another advantage of the present invention that an animal-actuated feeder is provided that has a food dish and lid therefor configured to promote maintenance of a palatable condition of the food contained therein.

It is another advantage of the present invention that an animal-actuated feeder is provided with a plurality of moat assembles configured to inhibit infestation by crawling arthropods while inhibiting access by animals to the moat medium.

It is another advantage of the present invention that an animal-actuated feeder is provided that may restrict access to the food until after the occurrence of a predetermined event.

The above and other advantages of the present invention are carried out in one form by an animal-actuated feeder having a case, a treadle, a compartment containing food, a cover denying the animal compartment access when closed, granting the animal compartment access when open, and transiting from closed to open when the treadle is tread upon by an animal desirous of obtaining the food, and a damper to dampen cover transit.

The above and other advantages of the present invention are carried out in another form by an animal-actuated feeder having a case, a treadle, a compartment containing food, a cover denying the animal compartment access when closed, granting the animal compartment access when open, and transiting from closed to open when the treadle is tread upon by an animal desirous of obtaining the food, a dish residing within the compartment and containing the food, and a lid mating with the dish when the cover is closed and promoting a palatable condition of the food.

The above and other advantages of the present invention are carried out in one form by an animal-actuated feeder resistant to crawling arthropods and having a case, a compartment containing food for an animal, a cover denying access to the compartment when closed and granting access to the compartment when open, and a plurality of moat assemblies inhibiting the crawling arthropods from gaining access to the food.

The above and other advantages of the present invention are carried out in one form by an animal feeding system having at least one animal-actuated feeder having a case, a treadle, a compartment containing food, a cover denying access to the compartment when closed and granting access to the compartment when open, a latch inhibiting the cover from transiting, and a control unit coupled to the latch and configured to release the latch, wherein the cover transits from closed to open when the latch is released and the treadle is tread upon by an animal desirous of obtaining the food.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
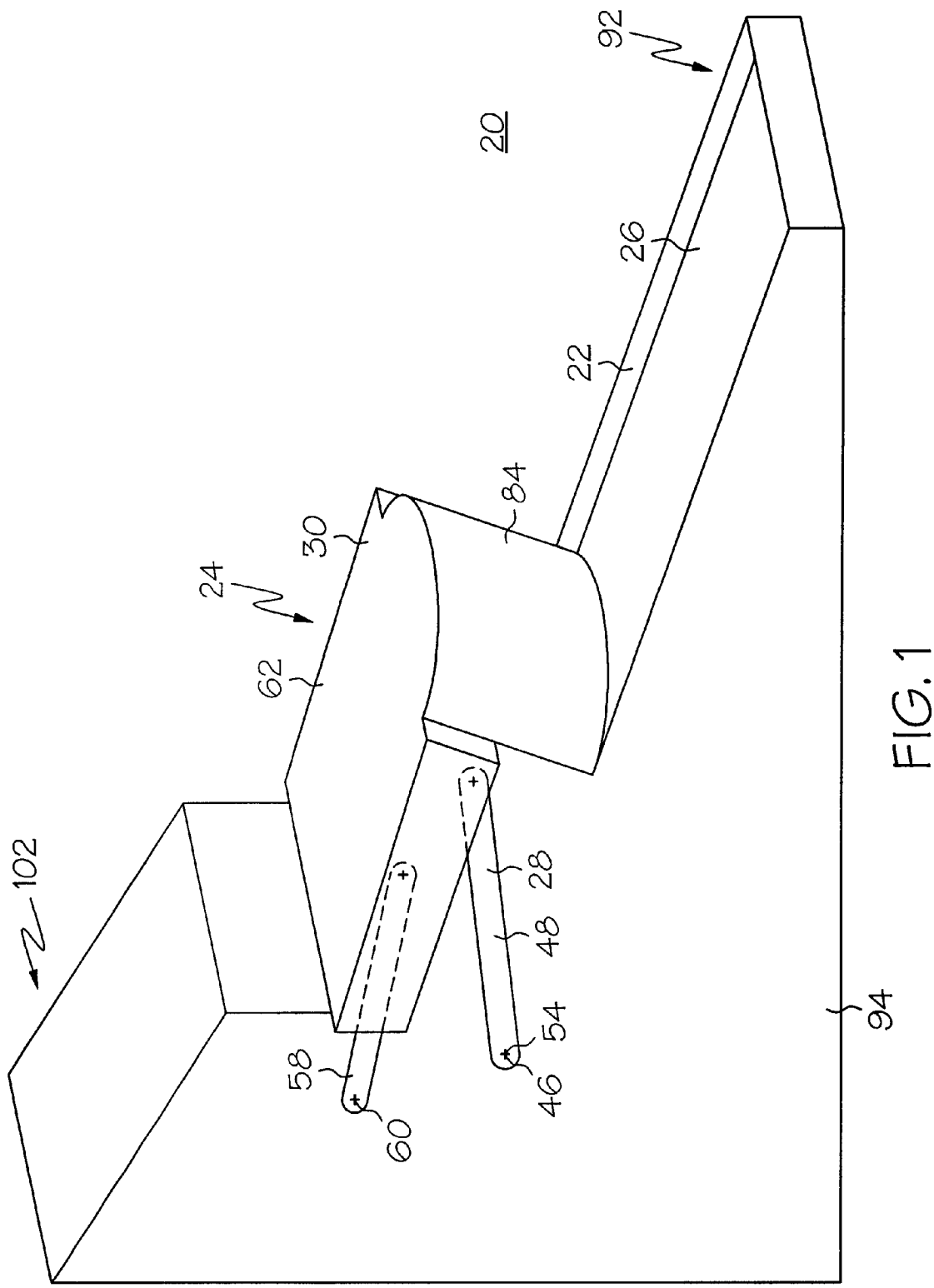
FIG. 1 shows a perspective view of an animal-actuated feeder in accordance with a preferred embodiment of the present invention.
Figure 2:
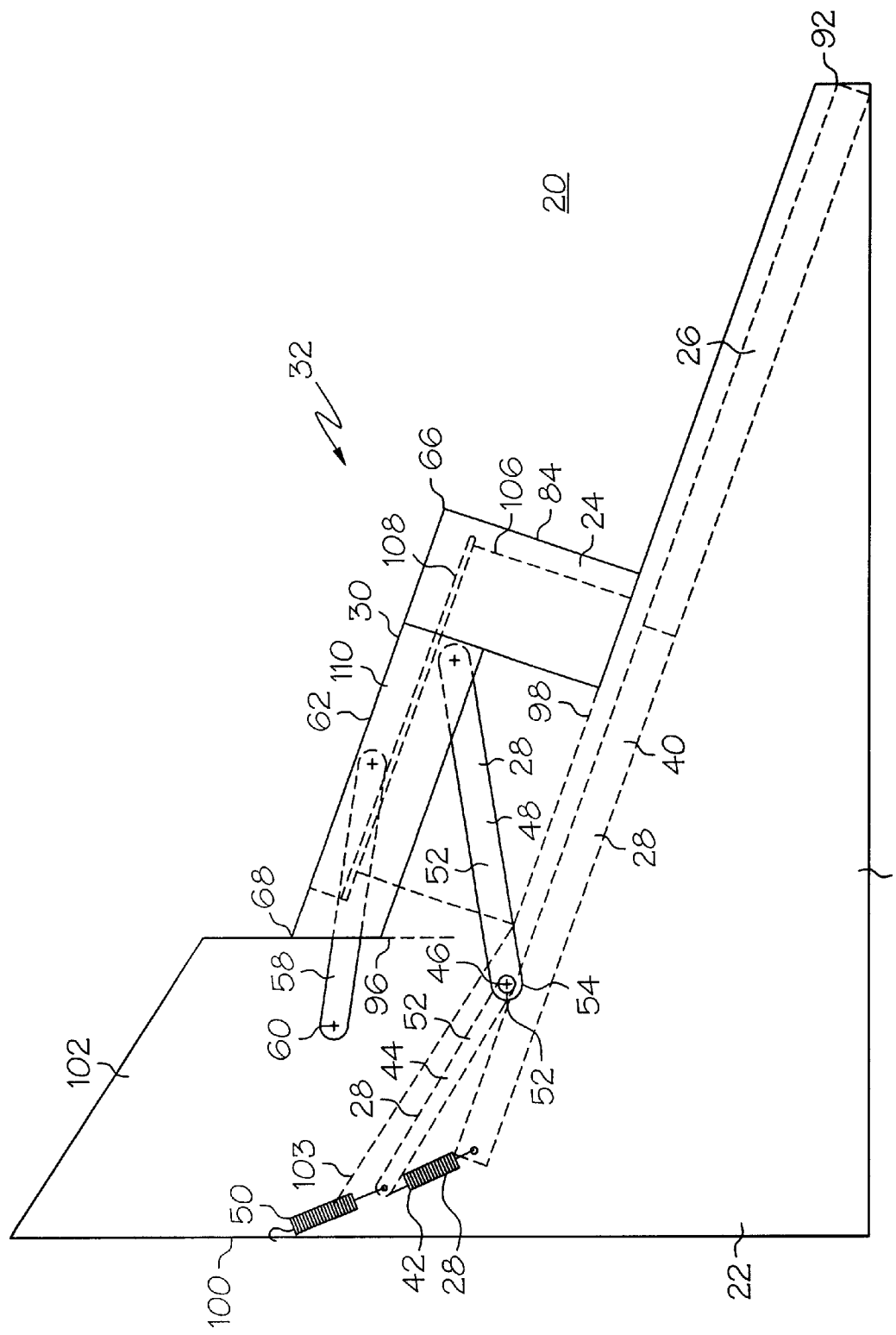
FIG. 2 shows a side view of the animal-actuated feeder of FIG. 1 depicting a case, a treadle, linkage, and a cover in a closed position in accordance with a preferred embodiment of the present invention.
Figure 3:
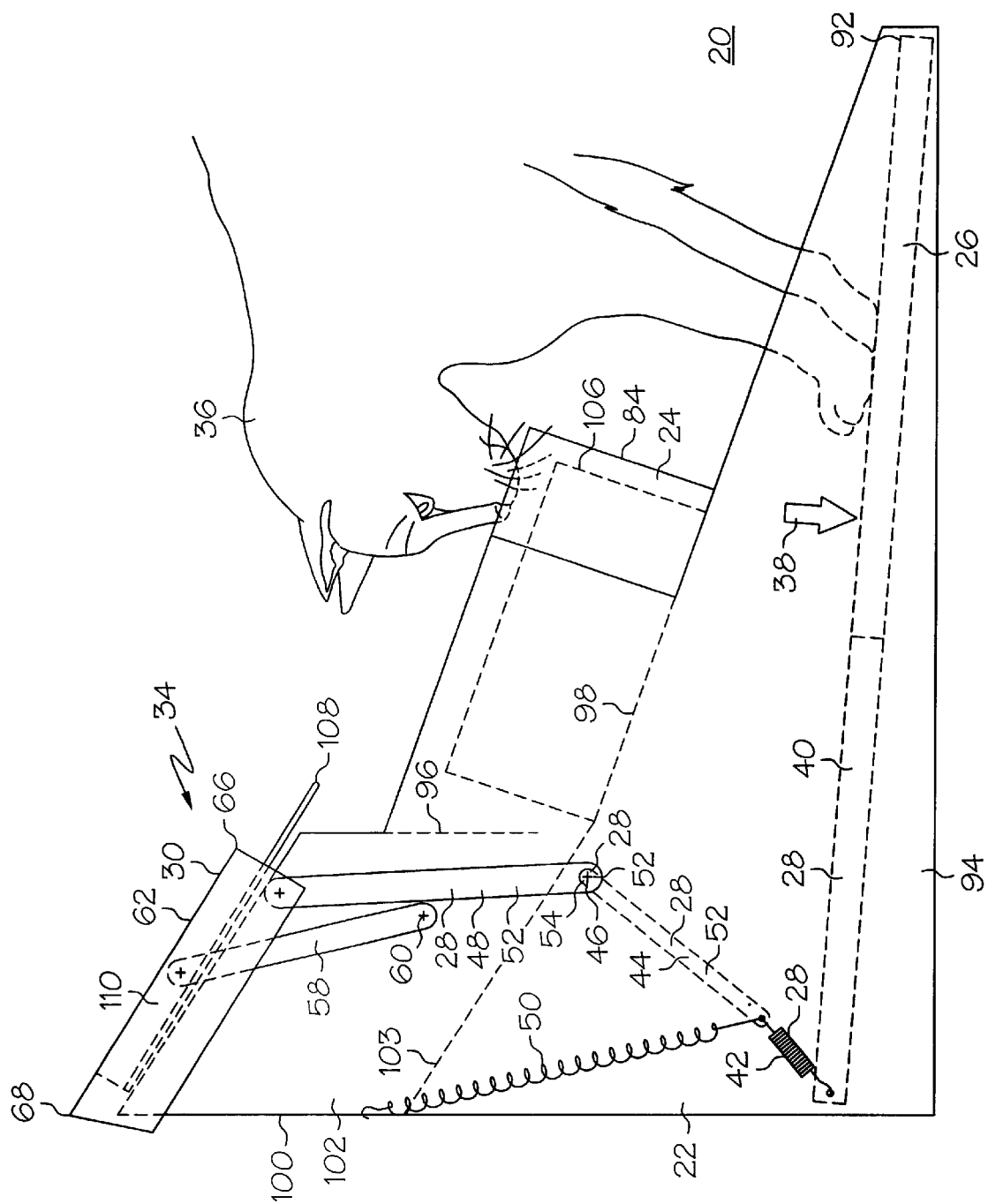
FIG. 3 shows a side view of the animal-actuated feeder of FIG. 2 with the cover in an open position in accordance with a preferred embodiment of the present invention.
Figure 4:
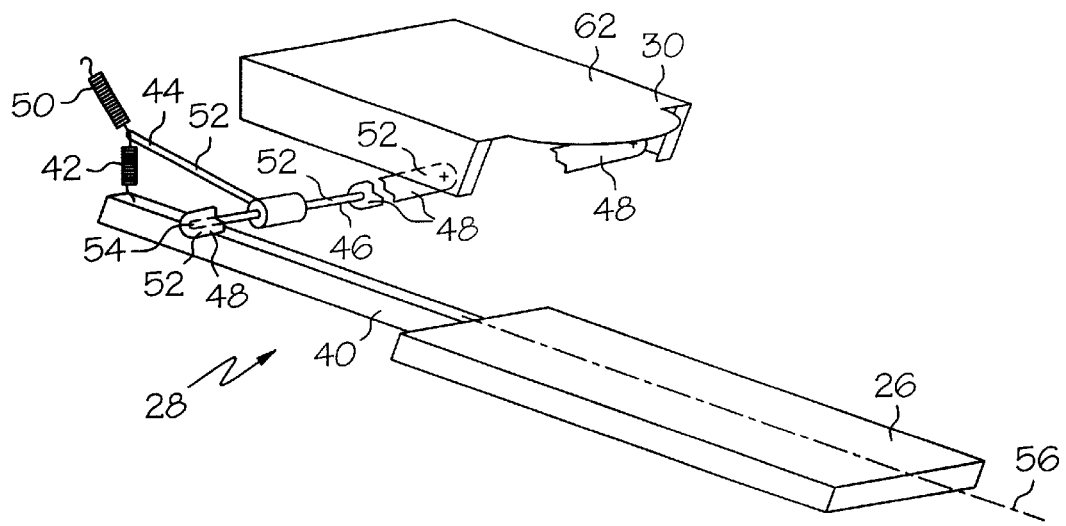
FIG. 4 shows a perspective view of the animal-actuated feeder of FIG. 1 with the case removed to demonstrate the interconnection between the treadle, linkage, and cover in accordance with a preferred embodiment of the present invention.

In accordance with a preferred embodiment of the present invention, FIG. 1 shows a perspective view of an animal-actuated feeder 20. FIGS. 2 and 3 show side views of animal-actuated feeder 20 depicting a case 22, a food compartment 24, a treadle 26, linkage 28, and a cover 30, with cover 30 in a closed position 32 in FIG. 2 and an open position 34 in FIG. 3. FIG. 4 shows a perspective view of animal-actuated feeder 20 with case 22 removed to demonstrate the interconnection between treadle 26, linkage 28, and cover 30. The following discussion refers to FIGS. 1 through 4.

Animal-actuated feeder 20 is made up of case 22 encompassing food compartment 24, compartment cover 30, treadle 26, and linkage 28 between treadle 26 and cover 30. Approaching feeder 20 from the front, an animal 36 desirous of obtaining food treads upon treadle 26 to gain access to compartment 24 and food (not shown) contained therein. The weight of animal 36 exerts a force 38 upon treadle 26. Force 38 causes treadle 26 to move downward. This in turn acts through linkage 28 to cause cover 30 to transit from closed position 32 to open position 34. Animal 36 therefore actuates feeder 20 and is granted access to the food contained therein by treading upon treadle 26.

As depicted in FIG. 4, linkage 28 is made up of treadle extension 40, link spring 42, link arm 44, transverse axle 46, left and right operating arms 48, and return spring 50. Left and right operating arms 48 are rigidly coupled to transverse axle 46 proximate the ends thereof. Link arm 44 is rigidly coupled to transverse axle 46 proximate a center thereof. Operating arms 48, link arm 44, and transverse axle 46 together form a substantially rigid link assembly 52. Link assembly 52 is configured to rotate about link pivots 54 (only left link pivot 54 shown) proximate the ends of transverse axle 46, typically where transverse axle 46 passes through suitable holes in case 22 (not shown). Link pivots 54 lie upon an axis (not shown) of transverse axle 46.

As animal 36 treads upon treadle 26, the weight of animal 36 applies a force 38 to force treadle 26 downward. Treadle extension 40 is rigidly coupled to treadle 26 substantially along a centerline 56 thereof. Treadle extension 40 couples to link assembly 52 through linking spring 42 proximate an end of link arm 44. Force 38 therefore causes link assembly 52 to rotate. Cover 30 is pivotally coupled to the ends of operating arms 48. As link assembly 52 rotates about link pivots 54, cover 30 is therefore moved up and away from compartment 24. Left and right idler arms 58 (see FIGS. 1, 2, and 3—only left idler arm 58 shown) rotate about idler pivots 60 (only left idler pivot 60 shown) at case 22, and serve to control the orientation and trajectory of cover 30 as cover 30 transits between closed and open positions 32 and 34.

Those skilled in the art will appreciate that FIGS. 2 and 3 exhibit the left side of feeder 20, and that a right side being a substantially mirror image of FIGS. 2 and 3, also exists. Any reference in this discussion will presume the existence of that right side and all components thereof and thereon.

Similarly, when animal 36 ceases applying force 38, i.e., when animal 36 steps off of treadle 26, gravity and return spring 50 cause cover 30 to transit from open position 34 to closed position 32, and treadle 26 assumes a normal, non-depressed position.

Figure 5:
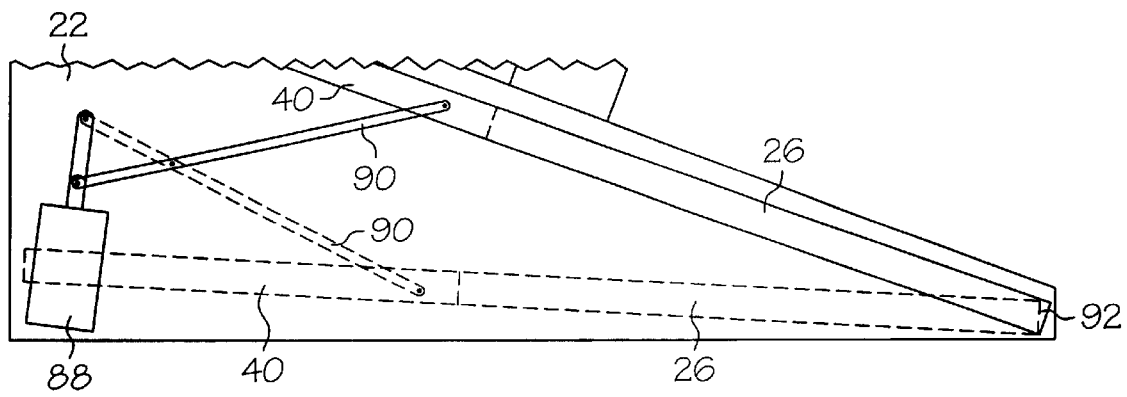
FIG. 5 shows a cutaway side view of a portion of an animal-actuated feeder having a damper in accordance with a preferred embodiment of the present invention.

FIG. 5 shows a cutaway side view of a portion of animal-actuated feeder 20 having a damper 88 in accordance with a preferred embodiment of the present invention. The following discussion refers to FIGS. 1 through 5.

Those skilled in the art will appreciate some animals 36 may be susceptible to being intimidated by rapid movements of cover 30 or treadle 26, or by loud or sharp noises created by those rapid movements. It may be desirable, therefore, to cause treadle 26 and/or cover 30 to move slowly under application and/or removal of force 38. This may be accomplished by coupling damper 88 to treadle 26, linkage 28, and cover 30. Damper 88 may be a bellows, a dashpot, or other damping device well known to those skilled in the art.

In FIG. 5, damper 88 is coupled directly to treadle 26. Since treadle 26 is coupled though linkage 28 to cover 30, coupling damper 88 to treadle 26 simultaneously couples damper 88 to cover 30. This allows damper 88 to act upon both treadle 26 and cover 30.

Those skilled in the art will appreciate that if it is desired to have damper 88 act upon cover 30 to the exclusion of treadle 26, damper 88 may be connected directly to link assembly 52 or cover 30. This would allow link spring 42 to effectively isolate treadle 26 from the action of damper 88.

When animal 36 treads upon treadle 26, thereby applying force 38, treadle 26 commences descent. This descent is transmitted to damper 88 via pivoting damping connector 90. Damper 88 is expanded thereby. Damper 88, by its very nature, inhibits rapid expansion and compression. This inhibition is transferred, via pivoting connector 90, to treadle 26. Treadle 26 therefore descends slowly. Cover 30, coupled to treadle 26 via linkage 28, slowly transits from closed position 32 to open position 34. Since this transit is effected slowly, a significant reduction in the noise produced by the transit is also effected. The resultant reduction in speed of motion and intensity of noise produced thereby results in a substantial reduction in potential intimidation of animal 36.

Similarly, when animal 36 removes force 38, i.e., steps off of treadle 26, treadle 26 commences ascent. This ascent is transmitted to damper 88 via pivoting damping connector 90. Damper 88 is compressed thereby. Since damper 88 inhibits rapid compression, which inhibition is transferred, via pivoting connector 90, to treadle 26, treadle 26 ascends slowly. Cover 30, coupled to treadle 26 via linkage 28, slowly transits from open position 34 to closed position 32. Therefore, both the opening and closing of cover 30 results in a resultant reduction in speed of motion and intensity of noise resulting therefrom. This in turn results in a substantial reduction in potential intimidation of animal 36.

Those skilled in the art will appreciate that the embodiment of damper 88 and its configuration and coupling method as depicted in FIG. 5 are exemplary only. Other dampers, other configuration, and/or other coupling methods may be used without departing from the spirit of the present invention.

Figure 6:
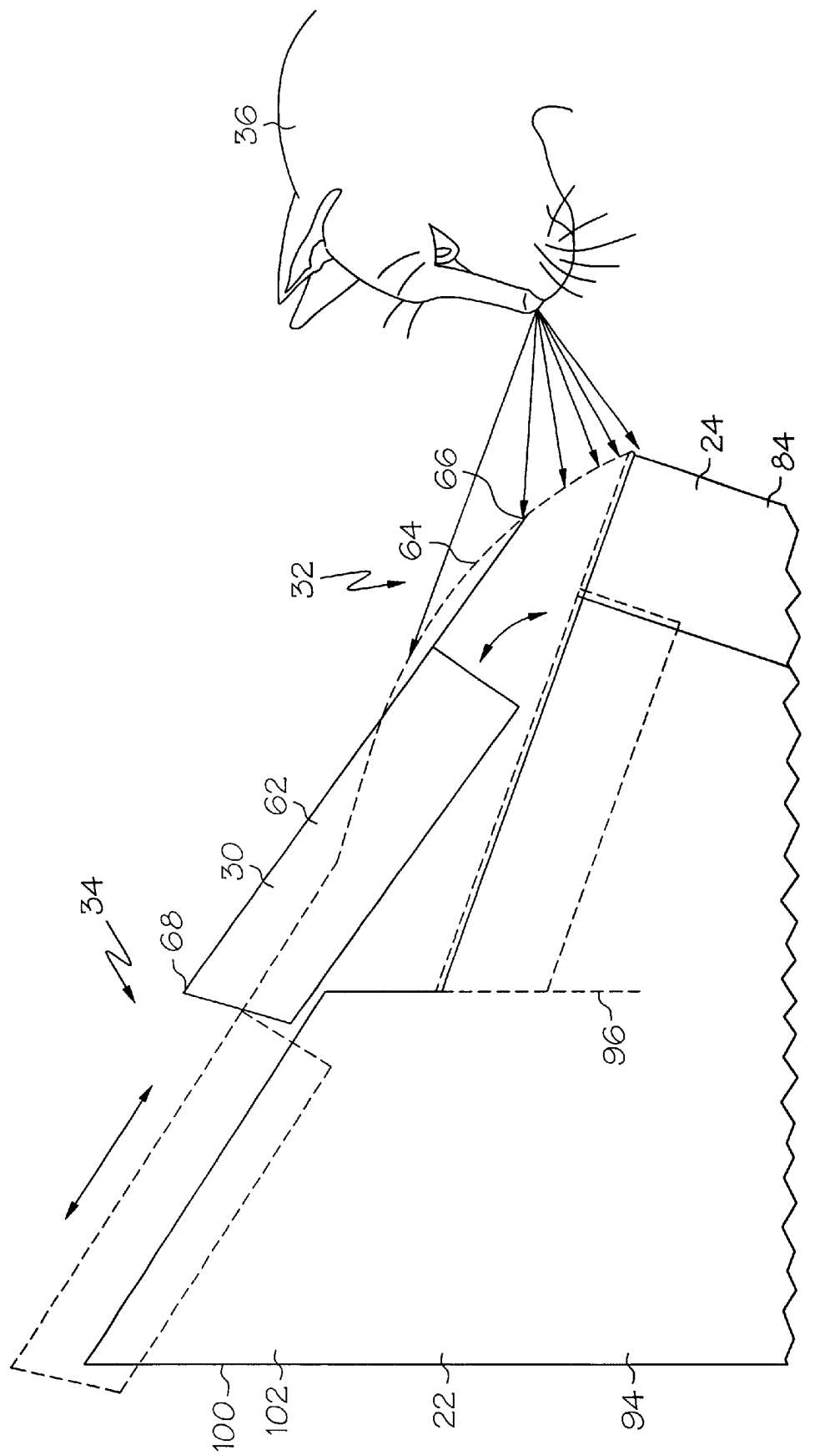
FIG. 6 shows a side view of a portion of an animal-actuated feeder having a gliding cover in transit between a closed position and an open position in accordance with a preferred embodiment of the present invention.

FIG. 6 shows a side view of a portion of animal-actuated feeder 20 having a gliding cover 62 in transit between closed position 32 and open position 34 in accordance with a preferred embodiment of the present invention. The following discussion refers to FIGS. 1 through 6.

Those skilled in the art will appreciate that certain animals 36, most notably cats, are more easily intimidated or startled by a device that moves towards them rapidly or unexpectedly. This is substantially ameliorated by the use of damper 88 (FIG. 5). In the preferred embodiments of FIGS. 1, 2, 3, 4, and 6, cover 30 is a gliding cover 62. That is, cover 30 is configured, by operating arms 48 and idler arms 58, to glide up and away from animal 36 when transiting from closed position 32 to open position 34 (see FIG. 6). By moving up and away from animal 36, the movement of gliding cover 62 is substantially non-intimidating to animal 36.

As gliding cover 62 begins to transit from open position 32 due to an application of force 38 by the first step of animal 36 upon treadle 26, gliding cover 62 does not abruptly rise towards animal 36, but follows a low trajectory 64, moving up and away from animal 36 to minimize intimidation that may result from the movement of gliding cover 62. Operating arms 48 rotate about link pivots 54 and idler arms 58 rotate about idler pivots 60. This causes gliding cover 62 to transit through non-intimidating trajectory 64. When coupled with damper 88 (FIG. 5), gliding cover 62 exhibits a quiet, non-intimidating movement and becomes a most preferred implementation of cover 30.

Together, operating arms 48 and idler arms 58 determine trajectory 64 of gliding cover 62 between closed and open positions 32 and 34. In order to cause gliding cover 62 and trajectory 64 to be as non-intimidating as feasible, gliding cover 62 is oriented in closed position 32 so that a front edge 66 thereof is below a rear edge 68 thereof. That is, gliding cover 62 slants up and away from animal 36 when in closed position 32. The lengths of arms 48 and 58 and the positions of pivots 54 and 60 are such that, throughout trajectory 64, front edge 66 of gliding cover 62 does not vertically rise above rear edge 68 of gliding cover 62. That is, gliding cover 62 is configured by pivots 54 and 60 and arms 48 and 58 to remain slanting up and away from animal 36 as gliding cover 62 transits between closed position 32 and open position 34.

Figure 7:
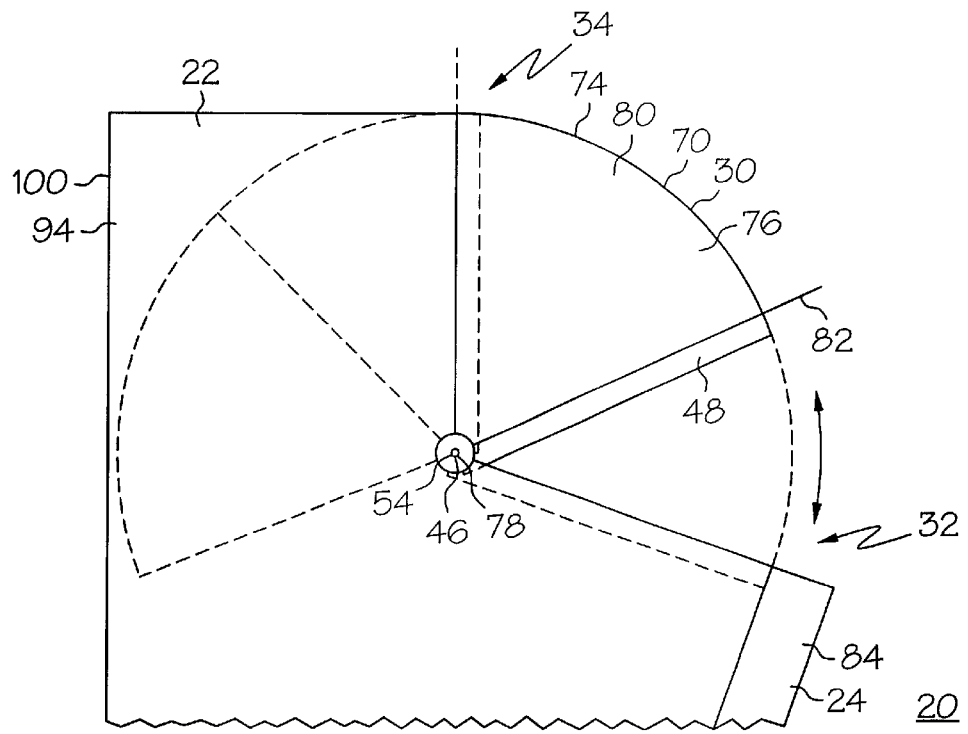
FIG. 7 shows a side view of a portion of an animal-actuated feeder having a drum cover in transit between a closed position and an open position in accordance with an alternative preferred embodiment of the present invention.
Figure 8:
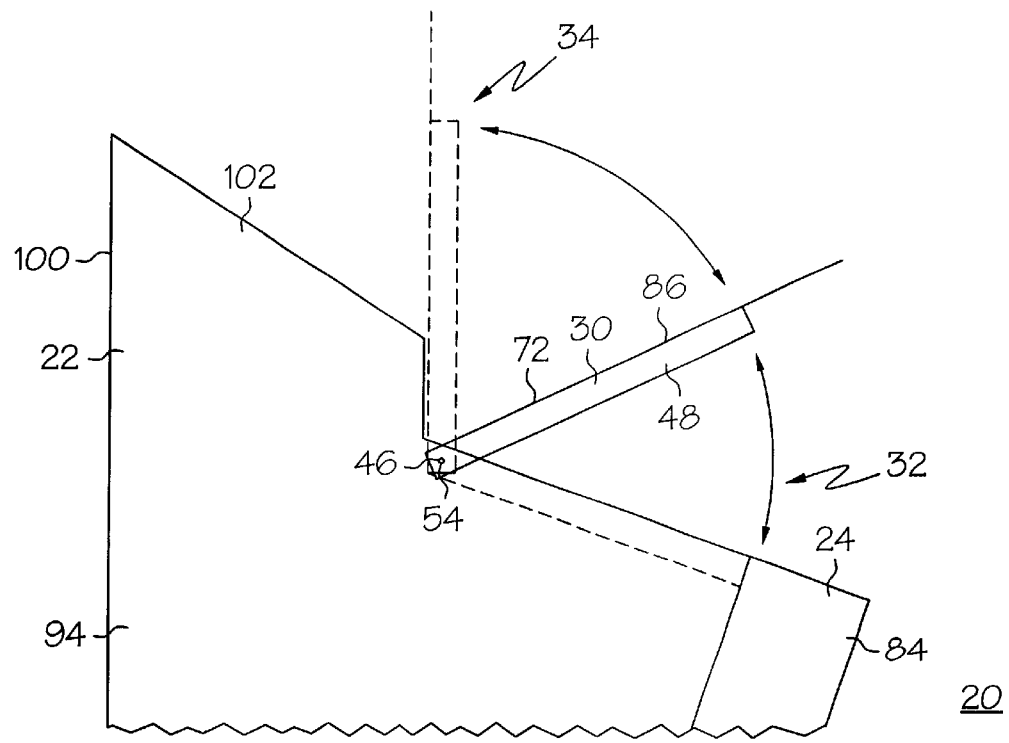
FIG. 8 shows a side view of a portion of an animal-actuated feeder having a flap cover in transit between a closed position and an open position in accordance with an alternative preferred embodiment of the present invention.

FIGS. 7 and 8 show side views of portions of animal-actuated feeder 20 having a drum cover 70 (FIG. 7) and a flap cover 72 (FIG. 8) in transit between a closed position and an open position in accordance with alternative preferred embodiments of the present invention. The following discussion refers to FIGS. 1, 4, 5, 7, and 8.

Those skilled in the art will appreciate that cover 30 may be other than gliding cover 62. In FIG. 7, cover 30 is realized as a drum cover 70. Drum cover 70 has a front 74 formed as an arc of a cylinder 76. Cylinder 76 has a centerline 78. Link assembly 52 (see FIGS. 2, 3, and 4) is positioned so that link pivots 54 are located upon cylinder centerline 78. Operating arms 48 are rigidly coupled to front 74 of drum cover 70. As depicted in FIG. 7, depending upon the configuration of case 22, operating arms 48 may become sides 80 of drum cover 70.

As animal 36 steps upon treadle 26, force 38 causes link assembly 52 and drum cover 70 to rotate about link pivots 54. Drum cover 70 rotates upward and into case 22. When coupled with damper 88 (FIG. 5), drum cover 70 exhibits a quiet, non-intimidating movement and becomes a more preferred implementation of cover 30.

In FIG. 8, cover 30 is realized as a flap cover 72. Flap cover 72 is formed as a flap 86 between operating arms 48.

As animal 36 steps upon treadle 26, force 38 causes link assembly 52 and flap cover 72 to rotate about link pivots 54. Flap cover 72 is cantilevered upward from closed position 32 to open position 34. The entirety of flap cover 72 rises upward and towards animal 36 during a first part of the transit from closed position 32 to open position 34. When coupled with damper 88 (FIG. 5), flap cover 72 exhibits a quiet, non-intimidating movement and becomes a preferred implementation of cover 30.

Those skilled in the art will appreciate that other forms of cover 30 other than gliding cover 62, drum cover 70 and flap cover 72 may be implemented without departing from the spirit of the present invention.

The following discussion refers to FIG. 4. Regardless of the implementation of cover 30, the use of treadle extension 40, link spring 42, and link assembly 52 assures that force 38 is substantially applied symmetrically to cover 30. That is, because treadle extension 40, link spring 42, and link arm 44, located and acting substantially along centerline 56 of treadle 26, apply force 38 substantially equally, through left and right operating arms 48, to left and right sides of cover 30. This in turn assures that cover 30 transits smoothly between closed position 32 and open position 34, thereby minimizing the opportunity for binding, even if animal 36 treads unevenly upon treadle 26.

The use of link spring 42 also assures that, if for any reason cover 30 is inhibited from transiting from open position 32 to closed position 34, no damage will occur to feeder 20. Link spring 42 will simply stretch while force 38 is applied.

Those skilled in the art will appreciate that other implementations of treadle 26, linkage 28, and cover 30 may be used without departing from the spirit of the present invention. For purposes of simplicity while striving for minimal intimidation of animal 36, the remainder of this document will assume that cover 30 is implemented as gliding cover 62.

The following discussion refers to FIGS. 1, 2, and 3.

Case 22 encompasses treadle 26. That is, treadle 26 is contained substantially within case 22. Treadle 26 is configured to pivot proximate a front edge 92 thereof. That is, treadle front edge 92 is pivotally coupled to case 22 by any of a number of means well known to those skilled in the art. Treadle 26 may have a textured surface to improve traction and present a reliable and comfortable feel to animal 36.

Food compartment 24 is formed within case 22 and serves as a container for food (not shown) to be accessed and consumed by animal 36. Food compartment 24 is defined by curved front wall 84 and side walls 94 of case 22, an interior barrier wall 96, and a sloping compartment floor 98. The slope of compartment floor 98 is chosen to allow various shapes of solid, dry food to readily slide forward under barrier wall 96 and into food compartment 24.

Cover 30 is coupled to compartment 24. When cover 30 is in closed position 32, cover 30 covers and conceals compartment 24. Access to compartment 24 and any food contained therein is therefore denied animal 36 when cover 30 is in closed position 32. Access to compartment 24 and any food therein is also denied many pests, such as birds, squirrels, toads, larger insects, and other creatures, when cover 30 is in closed position 32. The tensions of link spring 42 and return spring 50 are chosen so that cover 30 will remain closed when a creature significantly lighter than the desired animal 36 treads upon treadle 26. When in closed position 32, cover 30 also helps to inhibit drying of the food contained therein, thereby extending the palatability of the food. Optionally, cover 30 may include a viewing window (not shown) to observe whether food is present in compartment 24. When animal 36 treads upon treadle 26, cover 30 transits from closed position 32 to open position 34. Cover 30 then remains in open position 34 as long as animal 36 remains upon treadle 26. When cover 30 is in open position 34, cover 30 uncovers and exposes compartment 24. Access to compartment 24 and any food contained therein is therefore granted animal 36 when cover 30 is in open position 34. When animal 36 steps off treadle 26, cover 30 then returns to closed position 32.

Food contained in compartment 24 is presented at a comfortable height for easy consumption by animal 36. Food compartment 24 is formed with curved front wall 84. When cover 30 is in open position 34, compartment 24, being open at the top and curved in the front, does not interfere with the chin of animal 36.

The food rests in the bottom of food compartment 24. This minimizes scattering of particles of the food as animal 36 eats. This aids in keeping the area surrounding feeder 20 clean. This in turn reduces the attraction of pests to the area. Furthermore, curious toddlers and babies exploring the area do not find animal food to put in their mouths, and are less likely to open feeder 20 to remove food.

Figure 9:
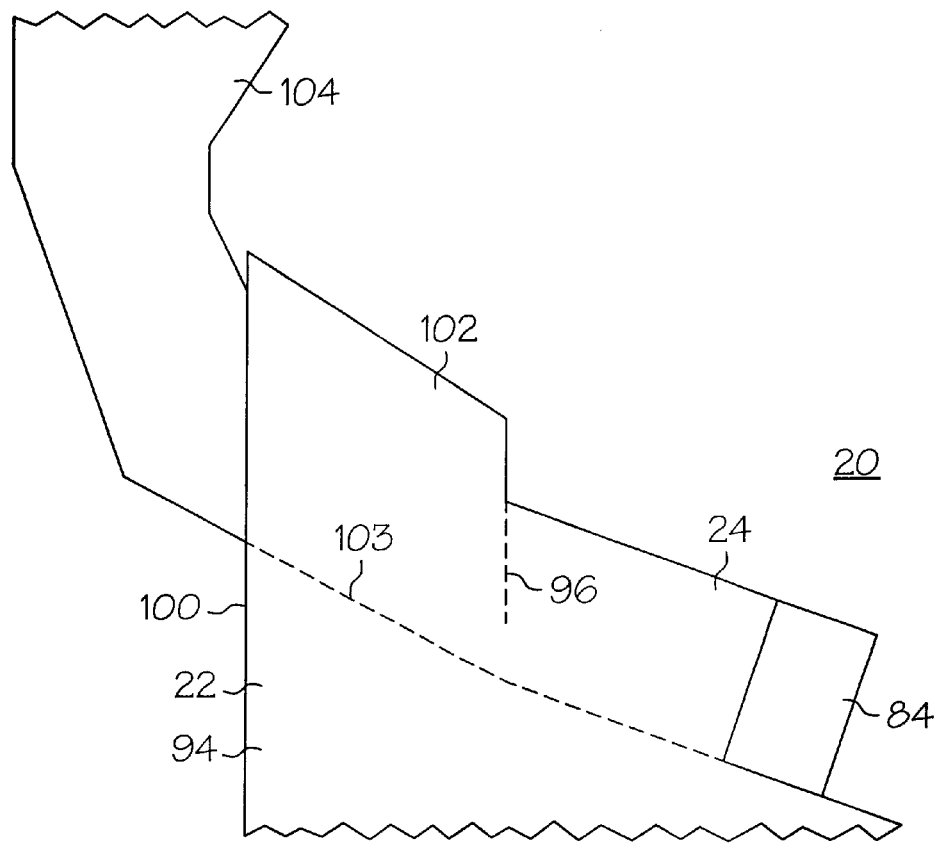
FIG. 9 shows a side view of a portion of an animal-actuated feeder incorporating an internal hopper and an optional external hopper in accordance with a preferred embodiment of the present invention.

FIG. 9 shows a side view of a portion of animal-actuated feeder 20 incorporating an internal hopper 102 and an optional external hopper 104 in accordance with a preferred embodiment of the present invention. The following discussion refers to FIGS. 2, 3, and 9.

As shown in FIG. 3, case 24 desirably provides a "parking area" for cover 30 when cover 30 is in open position 34. Desirably, only a small portion of cover 30 (i.e., less than thirty percent) or, more desirably, none of cover 30 should extend beyond a rear wall 100 of case 22. This allows feeder 20 to be positioned proximate a wall, thereby helping to inhibit animal 36 from moving feeder 20 while eating.

As shown in FIGS. 2, 3, and 9, the volume inside case 22 below cover 30 when cover 30 is in open position 34 may be utilized as internal hopper 102 when food is a bulk food, such as dry pet food, suitable for gravity-feed feeders. In this case, a quantity of food resides in food compartment 26 at any given time, while a greater quantity of food resides in internal hopper 102. Barrier wall 96 separates food compartment 24 from internal hopper 102 and aids in the control of the smaller quantity of food contained in food compartment 24. The slope of a floor 103 of internal hopper 102 is configured to allow various shapes of solid dry food to pass easily from internal hopper 102 and into food compartment 24. Those skilled in the art will appreciate that a hinged or sliding door (not shown) may be located on an upper surface of case 22 to allow the food to be inserted into internal hopper 102.

Where an even greater quantity of food is desired, as for feeding animal 36 over an extended time period (e.g., over a week-long vacation), an external hopper 104 may be coupled to internal hopper 102 to act as a large reservoir of food. An additional view of feeder 20 with external hopper 104 attached may be seen in FIG. 15, which is discussed in more detail hereinafter.

Figure 10:
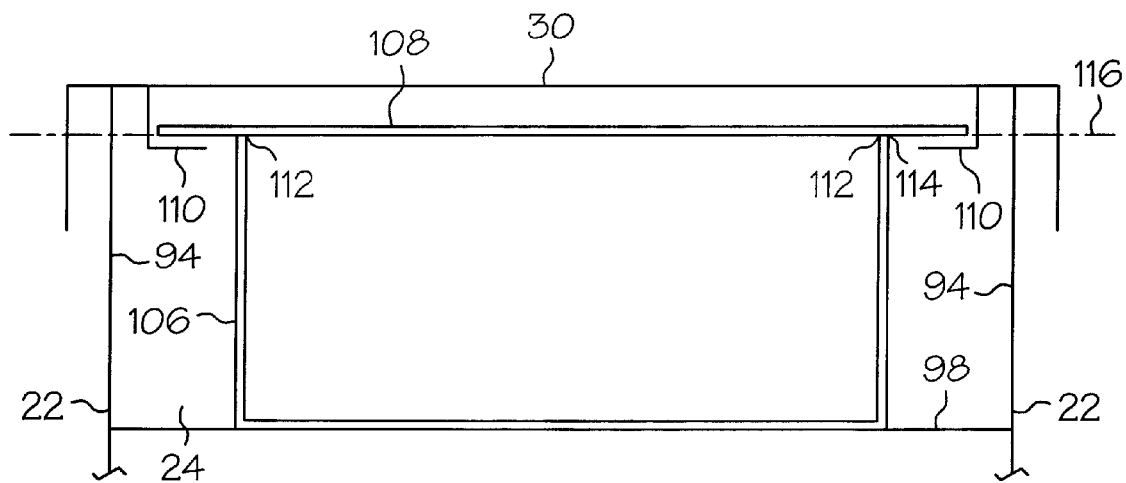
FIG. 10 shows a cross sectional front view of a portion of an animal-actuated feeder demonstrating an internal food dish and a floating lid therefor in accordance with a preferred embodiment of the present invention.

FIG. 10 shows a cross sectional front view of a portion of animal-actuated feeder 20 demonstrating an internal food dish 106 and a floating lid 108 therefor in accordance with a preferred embodiment of the present invention. The following discussion refers to FIGS. 2, 3, and 10.

It may be desirable for animal 36 to be fed a food, e.g., moist or semi-moist pet food, which spoils rapidly. Such foods may be placed in internal food dish 106 configured to reside within food compartment 24.

As observed in FIGS. 2, 3, and 10, floating lid 108 resides in a cradle 110 coupled to cover 30. While cover 30 is in closed position 32, floating lid 108 mates with food dish 106. Food dish 106 has a lip 112 desirably formed around a periphery 114 of dish 106. Lip 112 has a planar edge. That is, the entirety of lip 112 is configured to mate with lid 108 in a mating plane 116. This allows floating lid 108 to be planar. This in turn permits floating lid 108 to mate with dish lip 112 without a need for precision alignment.

By mating with dish lip 112 at mating plane 116, floating lid 108 effectively promotes a palatable condition of food contained in dish 106 over an extended period. "Palatable," in the context of this discussion, means the food is in a substantially fresh condition and free of vermin, therefore suitable for consumption by animal 36.

The planar mating of dish 106 and lid 108 substantially entraps moisture and odors within dish 106. The entrapment of moisture inhibits drying of the food. Food placed in dish 106 in the morning is most likely still moist and palatable when consumed by animal 36 in the evening.

The entrapment of odors within dish 106 is desirable, as some foods, e.g., canned cat food, may be quite noisome to humans. Additionally, the entrapment of odors inhibits the attraction of vermin and other pests. The planar mating of dish 106 and lid 108 also serves to inhibit access to the food by crawling and flying arthropods, e.g., ants and flies. Dry food may also be placed in dish 106 to exclude such pests.

Dish 106 is desirably formed of a sturdy, non-absorptive, and easily cleaned material, such as metal or hard plastic. Similarly, floating lid 108 may be formed of metal or hard plastic for the same reasons. Alternatively, floating lid 108 may be a membrane (not shown) in a sturdy and substantially planar frame (not shown). The use of a membrane allows lid 108 to deform slightly so as to improve the seal between lid 108 and dish 106.

Cover 30 incorporates cradle 110. Cradle 110 serves to support and confine floating lid 108 when cover 30 is in open position 34 (FIG. 3), and when cover 30 is transiting between open position 34 and closed position 32. When cover 30 is in closed position 32, cradle 110 releases floating lid 108 and allows floating lid 108 to be supported by and mate with food dish 106. It will be appreciated that food dish 106 need not rest with mating plane 116 parallel to cover 30, as floating lid 108 is configured to assume a wide range of positions while mating with dish 106. Food dish 106 may have positioning tabs or other devices (not shown) that substantially center dish 106 under cradle 110 when cover 30 is in closed position 32.

Figure 11:
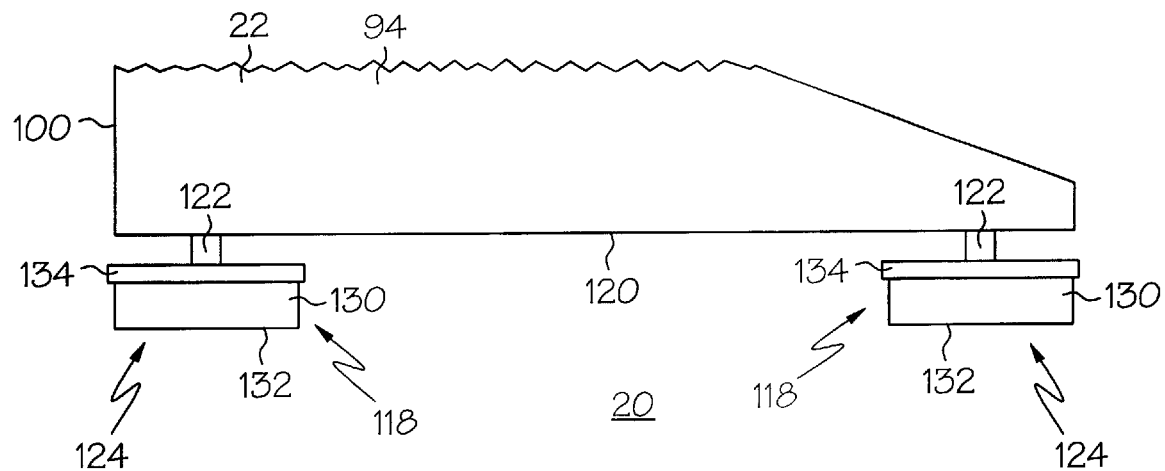
FIG. 11 shows a side view of a portion of an animal-actuated feeder having arthropod-resistant moat assemblies in accordance with a preferred embodiment of the present invention.
Figure 12:
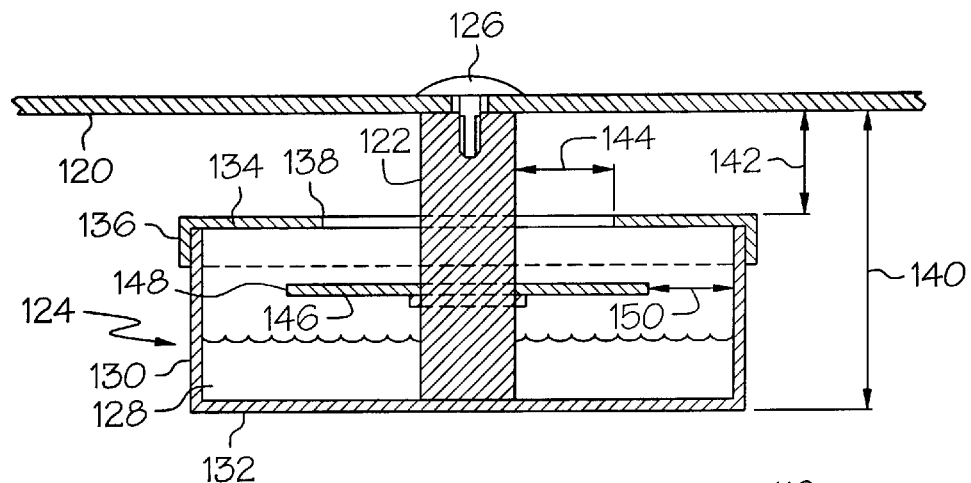
FIG. 12 shows a cross-sectional side view of a moat assembly in accordance with a preferred embodiment of the present invention.

FIG. 11 shows a side view of a portion of animal-actuated feeder 20 having a plurality of arthropod-resistant moat assemblies 118, and FIG. 12 shows a cross-sectional side view of one of moat assemblies 118 in accordance with a preferred embodiment of the present invention. The following discussion refers to FIGS. 11 and 12.

Crawling arthropods (i.e., insects, spiders, etc.) pose special problems in animal feeding environs. Moat assemblies 118 are configured to inhibit infestation by such vermin. FIG. 11 depicts optional arthropod-barrier attachments in the form of moat assemblies 118. Moat assemblies 118 may be easily attached to a bottom plate 120 of case 22 when needed. Moat assemblies 118 may also be easily detached from case 120 when such pests are not a problem. A minimum increase in height when moat assemblies 118 are installed is desirable to allow animal 36 to easily step on treadle 26.

Moat assemblies 118 deter ants and other crawling arthropods from entering feeder 20 by isolating feeder 20 from the ground or floor with support posts 122 that reside in moats 124. In a preferred embodiment, moat assemblies 118 are attached to bottom plate 120 by screws 126 or other common fasteners. Bottom plate 120 may then be affixed to case 22 by interlocking tabs (not shown).

Those skilled in the art will appreciate that other methods of attaching moat assemblies 118 to feeder 20 may be used without departing from the spirit of the present invention.

Each moat assembly 118 is configured so that, when installed, substantially no contiguous surface i.e., (a concatenation of surfaces not interrupted by water or other inhibiting medium) exists between the ground or floor and case 22 of feeder 20. Desirably, no part of any surface contiguous with the ground or floor comes closer to any surface contiguous with feeder 20 than a suitable minimum distance, such as 0.75 inch. This gap substantially inhibits the passage of ants and other crawling arthropods. Support post 122, contiguous with feeder 20, is isolated from other parts of moat assembly 118 by a medium 128 within moat 124 that presents a substantial barrier for crawling arthropods to cross.

FIG. 12 shows more detail of a single moat assembly 118. Crawling arthropods are impeded from crossing to case 22 of feeder 20 by support post 122 located in moat 124, where support post 122 is surrounded by medium 128 that greatly hinders the normal mobility of the crawling arthropods. Medium 128 may be water, water with a surfactant additive (e.g., dish detergent), a fine powder (e.g., chalk or talc), or other deterrent.

Water is a well-known deterrent to ants and other arthropods. In moat assembly 118, the crawling arthropods are required to swim across a relatively large distance to cross from an inner surface a peripheral containing wall 130 to support post 122. This provides a significant barrier.

The addition of a surfactant significantly reduces the surface tension of the water. With the reduced surface tension, ants and other crawling arthropods are unable to swim. Instead, they sink and drown. Surfactant-treated water therefore provides a superior barrier than water alone.

Water and other liquids, however, may be spilled by movement or tipping. Liquids will generally evaporate, thereby requiring periodic refilling of moats 124.

Fine powder, such as chalk (gypsum) or talc, is perhaps a less well-known deterrent. Powder causes the arthropods that enter it to founder and lose their ability to climb vertical surfaces. After a few become entrapped in the powder, others hesitate to follow. Powder is not disturbed in normal handling nor lost from moat 124 except under the extreme condition of complete inversion. The advantage of powder over liquid is the longer time between refills and reduced tendency to spill. However, powder is to some degree hygroscopic and may cake and lose its efficiency, especially in moist climes.

Each moat assembly 118 is made up of peripheral containing wall 130, a base 132, and support post 122 coupled to base 132 to form moat 124 to contain arthropod-inhibiting medium 128. Support post 122 serves as one of a plurality of legs supporting feeder 20. A moat cover 134 has an outer periphery 136 configured to be removably coupled to peripheral containing wall 130 (e.g., a snap-on cover), and an inner periphery 138 configured to surround support post 122.

Support post 122 has a length 140 sufficient to cause moat cover 134 to be separated from bottom plate 120 of case 22 by a first predetermined distance. Inner periphery 138 of moat cover 134 is separated from support post 122 by a second predetermined distance 144. Predetermined distances 142 and 144 are sufficient to inhibit bridging by ants and other crawling arthropods, desirably 0.75 inch or greater.

Moat cover 134 serves as a splash barrier to inhibit spillage of medium 128 when feeder 20 is jostled and/or transported. Moat cover 128 also serves to retard evaporation of medium 128 when medium 128 is a liquid.

Moat assembly 118 desirably also includes a baffle 146 coupled to support post 122. Baffle 146 has an outer periphery separated from an inner surface of peripheral containing wall 130 by a third predetermined distance 150 sufficient to inhibit bridging by ants and other crawling arthropods, desirably 0.75 inch or greater.

It is not desirable that animal 36 have access to medium 128. When medium 128 is simple water, access by animal 36 will allow animal 36 to drink the water, thereby removing medium 128 and rendering one or more moat assemblies 118 ineffective. When medium 128 is a liquid other than water, access by animal 36 may pose a health hazard to animal 36 as well as a loss of medium 128. When medium 128 is a powder, access by animal 36 may introduce saliva into medium 128 and render medium 128 ineffective. Moat cover 134 and baffle 146 together are configured to inhibit access to medium 128 by animal 36.

Figure 13:
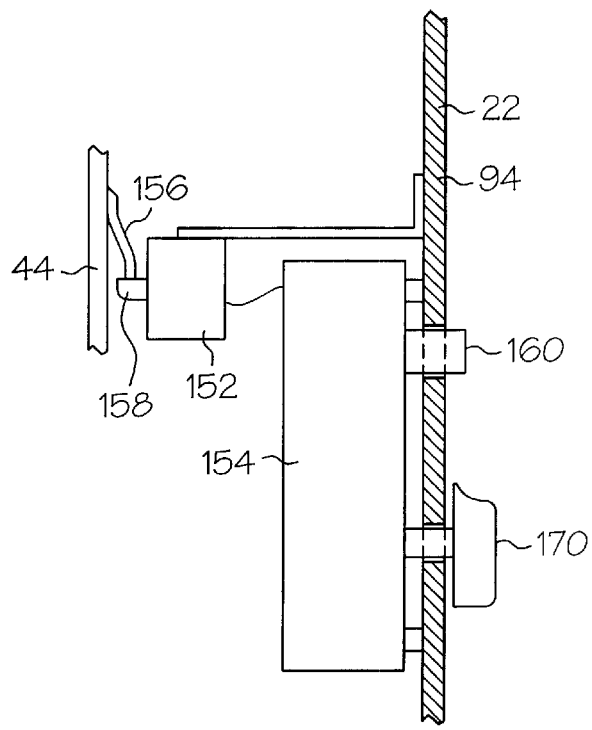
FIG. 13 shows a cutaway back view of an interior portion of an animal-actuated feeder demonstrating a cover latch and control unit in accordance with a preferred embodiment of the present invention.
Figure 14:
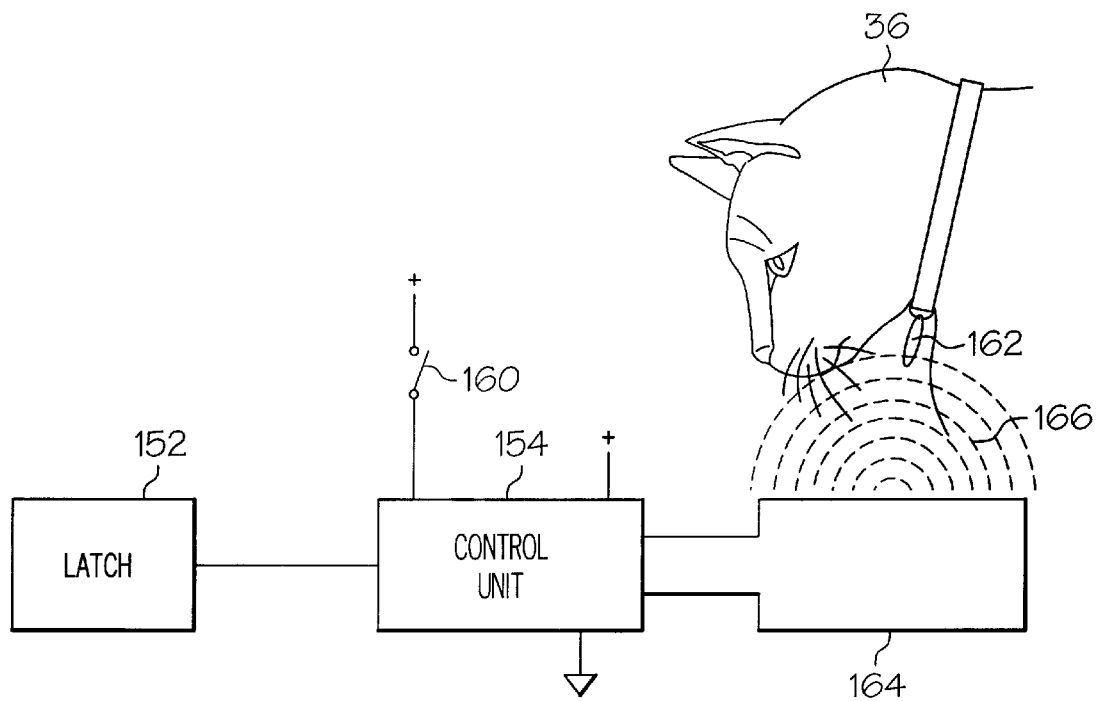
FIG. 14 shows a schematic view of a control circuit for an animal-actuated feeder in accordance with a preferred embodiment of the present invention.

FIG. 13 shows a cutaway back view of an interior portion of animal-actuated feeder 20 demonstrating a cover latch 152 and a control unit 154, and FIG. 14 shows a schematic view of latch 152, control unit 154, and a sensor 164 for animal-actuated feeder 20 in accordance with a preferred embodiment of the present invention. The following discussion refers to FIGS. 1, 2, 3, 13, and 14.

Animal-actuated feeder 20, as discussed hereinbefore, grants animal 36 access to food compartment 24 and any food contained therein when animal 36 treads upon treadle 26. It is often desirable to limit access to food compartment 24 and any food contained therein. An access limitation may be imposed upon animal 36, i.e., animal 36 is granted access to food compartment 24 only when animal 36 treads upon treadle 26 and some other condition is also met. An access limitation may also be imposed upon animals other than animal 36, i.e., only animal 36 may tread upon treadle 26 and be granted access to food compartment 24.

In FIG. 13, latch 152 is shown coupled to link arm 44 so that link arm 44 may not descend, hence cover 30 may not transit from closed position 32 to open position 34. A strike member 156 is fixedly attached to link arm 44, hence coupled to cover 30. When cover 30 is in closed position 32, strike member 156 is at its highest position and a bolt 158 of latch 152 engages strike member 156 to prevent downward movement thereof. Cover 30 is therefore prevented from transiting from closed position 32 to open position 34 until latch 152 is released. Bolt 158 and strike member 156 are desirably shaped so that cover 30 is not inhibited from transiting from open position 34 to closed position 32.

Those skilled in the art will appreciate that the coupling of latch 152 and cover 30 depicted in FIG. 13 is exemplary only and not a requirement of the present invention. Many other methods of coupling latch 152 and cover 30 may be effected without departing from the spirit of the present invention.

Latch 152 is coupled to and under the control of control unit 154. That is, control unit 154 determines whether latch 152 is latched or released at any given instant. Control unit 154 is configured to release latch 152 upon the occurrence of a predetermined condition. Animal 36 is granted access to food compartment 24 after the occurrence of the predetermined condition.

An access limitation may be imposed upon animal 36, i.e., animal 36 is granted access to food compartment 24 only when animal 36 treads upon treadle 26 and the predetermined condition is also met. For example, the predetermined condition may be the arrival of a predetermined time (i.e., control unit 154 is a clock or timer). Control unit 154 releases latch 152 upon occurrence of the predetermined time and remains released thereafter until reset. Animal 36 is therefore denied access to food compartment 24 at any time before the occurrence of the predetermined time even if animal 36 treads upon treadle 26, and is granted access to food compartment 24 at any time after the occurrence of the predetermined time only when animal 36 treads upon treadle 26. Food contained in food compartment 24 would therefore remain inaccessible until after the predetermined time has occurred and animal 36 has tread upon treadle 26.

Those skilled in the art will appreciate that, as a clock or timer, control unit 154 may be mechanical or electronic as desired. Adjustment of the timed interval may be effected by a timer control knob 170. If control unit 154 is electronic, an interlock switch 160 (FIG. 14) coupled to treadle 26 may be used to apply power to latch 152 through control circuit 154 to significantly extend battery life. The use of these and other implementations of control unit 154 do not depart from the spirit of the present invention.

An access limitation may also be imposed upon animals other than animal 36 by granting access to food compartment 24 when animal 36 treads upon treadle 26, and denying access to food compartment 24 when any animal other than animal 36 treads upon treadle 26. Food contained in food compartment 24 would therefore remain protected until animal 36 specifically has tread upon treadle 26.

In this embodiment, animal 36 wears or carries a tag unit 162. A sensor 164 coupled to control unit 154 detects the presence of tag unit 162 to identify animal 36.

In a preferred implementation of this embodiment, animal 36 treads upon treadle 26 while wearing tag unit 162. Treadle 26 moves down slightly, closing interlock switch 160 to activate control unit 154. Control unit 154 causes sensor 164 to radiate an electromagnetic field 166 proximate and above treadle 26. Tag unit 162 contains a passive electronic circuit (not shown) responsive to that predetermined frequency. This passive circuit absorbs energy from electromagnetic field 166, which absorption is then detected by control unit 154. Control unit 154 then releases latch 152, and cover 30 transits from closed position 32 to open position 34, granting animal 36 access to food compartment 24 and any food contained therein.

If an animal other than animal 36 were to tread upon treadle 26, energy from electromagnetic field 166 would not be absorbed, control unit 154 would not release latch 152, cover 30 would remain in closed position 32, and the animal would be denied access to food compartment 24.

In an exemplary circuit to effect this preferred embodiment, control unit 154 contains an oscillator (not shown) configured to oscillate at the predetermined frequency, and a detector (not shown) configured to monitor the strength of the output of the oscillator. The oscillator is coupled to sensor 164, which need be no more than a loop around treadle 26, to produce electromagnetic field 166 proximate and above treadle 26.

The passive circuit (not shown) within tag unit 162 may be a simple coil-and-capacitor tank circuit tuned to the preferred frequency. When tag unit 162 enters electromagnetic field 166, the tank circuit absorbs energy from electromagnetic field 166, and the output of the oscillator decreases. The detector detects this decrease, and causes control unit 154 to activate latch 152.

Tag unit 162 is desirably as small as practical. Preferably, tag unit 162 is small enough to be encapsulated into a plastic lozenge or tag, no larger than a conventional pet identification or license tag, and suspended from a collar (see FIG. 14).

It will be appreciated by those skilled in the art that the implementation presented herein is exemplary only. The use of another implementation does not depart from the spirit of the present invention.

Desirably, control unit 154 and latch 152 are battery powered, thereby eliminating any power connections that may be awkward to implement, may become disconnected or subject to power failure, and/or may be damaged by animal 36 or others. To extend the life of the batteries used to power control unit 154 and latch 152, interlock switch 160 may be implemented to activate control unit 154 for a short interval during the descent of treadle 26, the details of which implementation are obvious to one skilled in the art. In this manner, the life of the batteries may be made to approach their shelf life.

By being passive, tag unit 162 requires no battery of its own and derives its energy from electromagnetic field 166 radiated by sensor 164. If tag unit 162 is absorptive rather than radiative, electromagnetic field 166 may be of very low power, further extending battery life. By being responsive (i.e., tuned) to the predetermined frequency, tag unit 162 will not absorb energy from electromagnetic fields 166 having frequencies other than the predetermined frequency.

Figure 15:
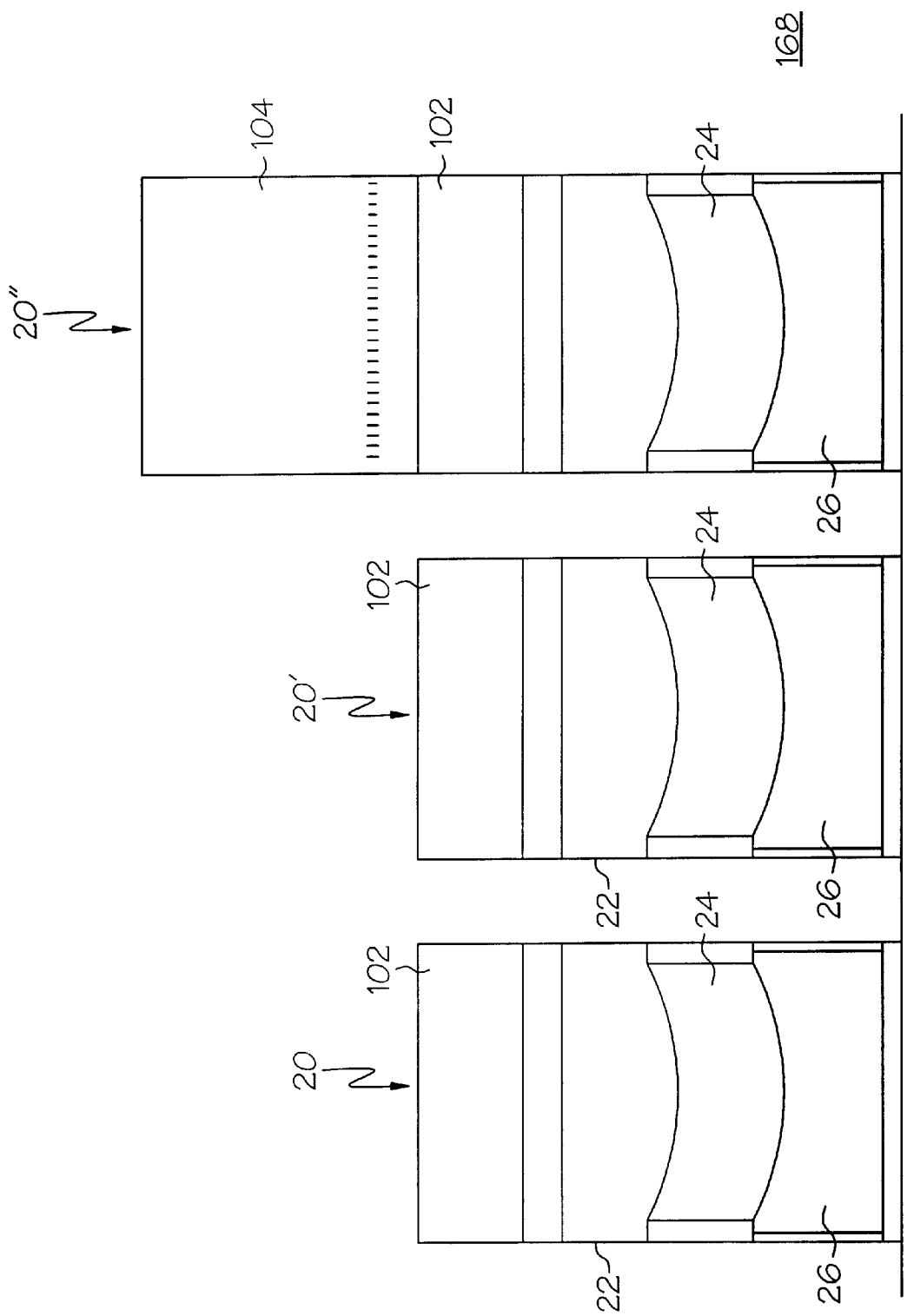
FIG. 15 shows a front view of an animal feeding system having a plurality of animal-actuated feeders in accordance with a preferred embodiment of the present invention.

FIG. 15 shows a front view of an animal feeding system 168 having a plurality of animal-actuated feeders 20 in accordance with a preferred embodiment of the present invention. The following description refers to FIGS. 1, 14, and 15.

Since tag unit 162 is responsive to a predetermined frequency, feeding system 168 may have a plurality of animal-activated feeders 20, each configured to radiate an electromagnetic field 166 at a different predetermined frequency, and each configured to be accessed by a specific animal 36 wearing a tag unit 162 responsive to the predetermined frequency of the feeder 20 for that animal 36.

In the preferred implementation discussed hereinbefore in connection with FIG. 14, the oscillator (not shown) within control unit 154 may have an interchangeable or adjustable component to select a specific predetermined frequency. Alternatively, control unit 154 may be programmed to operate at the specific predetermined frequency, or may be programmed to scan a specific tag unit 162, remember the predetermined frequency of that tag unit 162, and operate at that frequency thereafter. Those skilled in the art will appreciate that other methods of determining control unit-tag unit pairs may be used without departing from the spirit of the present invention. For example, let us assume that the three-feeder feeding system 168 demonstrated in FIG. 15 is intended for use in a six-animal household where a first animal (not shown) requires a special low-magnesium diet, a second animal (not shown) requires a medicated diet, and the third through sixth animals (not shown) require a normal diet. A first feeder 20 contains low-magnesium food and radiates a first electromagnetic field 166 at a first frequency, a second feeder 20' contains medicated food and radiates a second electromagnetic field 166 at a second frequency, and a third feeder 20" (which is shown with optional external hopper 104 affixed) contains normal food and radiates a third electromagnetic field 166 at a third frequency. The first animal 36 wears a tag unit 162 responsive to the first frequency, and therefore may eat from first feeder 20 but not from second or third feeders 20' and 20". The second animal 36 wears a tag unit 162 responsive to the second frequency, and therefore may eat from second feeder 20' but not from first or third feeders 20 and 20". The third through sixth animals 36 wear tag units 162 responsive to the third frequency, and therefore may eat from third feeder 20" but not from first or second feeders 20 and 20'. In this manner, control over the diets of the six animals 36 is maintained.

One skilled in the art will appreciate that the above scenario is exemplary only and not a requirement of the present invention. Myriad other scenarios are possible utilizing a plurality of predetermined frequencies, and the use of any of these alternative possibilities does not depart from the spirit of the present invention.

One skilled in the art will also appreciate that the predetermined conditions described hereinbefore are exemplary and the present invention is not limited to those described conditions. The use of other predetermined conditions and/or combinations of conditions does not depart from the spirit of the present invention.

Those skilled in the art will appreciate that feeder 20 may be constructed of any of a plurality of durable materials, such as high-impact plastic or metal, and in a variety of sizes to accommodate large or small animals 36. Link and return springs 42 and 50 may be coated with a suitable material to inhibit corrosion, and latch 152 and control unit 154 may be appropriately sealed to inhibit contamination. Thus, feeder 20 in its entirety may be made weather resistant and washable as required.

In summary, the present invention teaches an animal-actuated feeder 20. Food compartment 24 of feeder 20 is open only while animal 36 treads upon treadle 26, is at a convenient height and position for the ingestion of food by animal 36, automatically closes to exclude pests, and has an associated hopper that may supply food for an extended period of time. Food compartment cover 30 opens and closes in a non-intimidating manner. Food dish 106 and floating lid 108 substantially confine moisture and odors of the food contained therein, thereby promoting maintenance of a palatable condition of the food, and are removable for cleaning. Moat assemblies 118 of feeder 20 inhibit infestation by crawling arthropods, inhibit access by animal 36 to an arthropod-inhibiting medium 128 contained within moats 124, and inhibit splashing and spillage of medium 128 during transport. Feeder 20 may be accessed only by a specific animal 36 and/or after the occurrence of a predetermined event.

Although the preferred embodiments of the invention have been illustrated and described in detail, it will be readily apparent to those skilled in the art that various modifications may be made therein without departing from the spirit of the invention or from the scope of the appended claims.

What is claimed is:

1. An animal-actuated feeder comprising:
    a case;
    a treadle coupled to said case and configured to be tread upon by an animal desirous of obtaining food;
    a compartment formed within said case and configured to contain said food;
    a cover coupled to said compartment and said treadle, configured to reside in a closed position in which access to said compartment is denied to said animal, configured to reside in an open position in which access to said compartment is granted to said animal, and configured to transit from said closed position to said open position when said treadle is tread upon by said animal; and
    a damper coupled to said cover and configured to dampen transit between said open position and said closed position.

2. An animal-actuated feeder as claimed in claim 1 wherein:
    said cover is configured as an arc of a cylinder; and
    said cover is configured to pivot about an axis substantially at a centerline of said cylinder as said cover transits between said closed position and said open position.

3. An animal-actuated feeder as claimed in claim 1 wherein:
    said cover has a front edge and a rear edge; and
    said cover is configured so that said front edge does not vertically rise above said rear edge as said cover transits from said closed position to said open position.

4. An animal-actuated feeder as claimed in claim 3 wherein said case is configured so that, when said cover is in said open position, less than thirty percent of said cover protrudes horizontally beyond a rear of said case.

5. An animal-actuated feeder as claimed in claim 1 wherein:
    said food contained in said compartment is a lesser quantity of said food; and
    said feeder additionally comprises a hopper coupled to said compartment, configured to house a greater quantity of said food, and configured to supply portions of said greater quantity of said food to said compartment to maintain said lesser quantity of said food within said compartment.

6. An animal-actuated feeder as claimed in claim 1 wherein:
    said feeder additionally comprises a latch coupled to said cover and configured to inhibit said cover from transiting from said closed position to said open position until said latch is released; and
    said cover is configured to transit from said closed position to said open position when said latch is released and said treadle is tread upon by said animal.

7. An animal-actuated feeder as claimed in claim 1 additionally comprising a linkage coupling said treadle to said cover substantially along a centerline of said treadle.

8. An animal-actuated feeder as claimed in claim 7 wherein said linkage comprises a spring configured to inhibit damage to said feeder when said treadle is tread upon by said animal and said cover is inhibited from transiting from said closed position to said open position.

9. An animal-actuated feeder comprising:
a case;
a treadle coupled to said case and configured to be tread upon by an animal desirous of obtaining food;
a compartment formed within said case and configured to contain said food;
a cover coupled to said compartment and said treadle, configured to reside in a closed position in which access to said compartment is denied to said animal, configured to reside in an open position in which access to said compartment is granted to said animal, and configured to transit from said closed position to said open position when said treadle is tread upon by said animal;
a dish configured to reside within said compartment and configured to contain said food therein; and
a lid coupled to said cover, configured to mate with said dish when said cover is in said closed position, and configured to promote a palatable condition of said food when mated with said dish.

10. An animal-actuated feeder as claimed in claim 9 wherein said cover has a front edge and a rear edge and is configured so that said front edge does not vertically rise above said rear edge as said cover transits from said closed position to said open position.

11. An animal-actuated feeder as claimed in claim 10 wherein said dish comprises a lip formed upon a periphery of said dish in substantially a mating plane, wherein said lid mates with said lip at said mating plane over substantially all of said periphery when said cover is in said closed position.

12. An animal-actuated feeder as claimed in claim 11 wherein, when said lid is mated with said dish, said lid substantially entraps moisture and odors of said food within said dish.

13. An animal-actuated feeder as claimed in claim 9 wherein said cover comprises a cradle configured to support said lid while said cover is in said open position, configured to support said lid while said cover transits between said closed position and said open position, and configured to allow said lid to be supported by and mate with said dish while said cover is in said closed position.

14. An animal-actuated feeder as claimed in claim 9 additionally comprising a damper coupled to said cover and configured to dampen transit between said open position and said closed position.

15. An animal-actuated feeder as claimed in claim 9 wherein:
said feeder additionally comprises a latch coupled to said cover and configured to inhibit said cover from transiting from said closed position to said open position until said latch is released; and
said cover is configured to transit from said closed position to said open position when said latch is released and said treadle is tread upon by said animal.

16. An animal-actuated feeder as claimed in claim 15 wherein:
said feeder additionally comprises a control unit configured to release said latch upon occurrence of a predetermined condition; and
said cover is configured to transit from said closed position to said open position when said treadle is tread upon by said animal after said occurrence of said predetermined condition.

17. An animal-actuated feeder as claimed in claim 15 wherein said animal is one of a plurality of animals, and wherein said feeder additionally comprises a control unit configured to release said latch upon detection of said one animal upon said treadle, and configured to refrain from releasing said latch when said one animal is not detected upon said treadle.

18. An animal-actuated feeder resistant to crawling arthropods, said feeder comprising:
a case;
a compartment formed within said case and configured to contain food for an animal;
a cover coupled to said compartment, configured to reside in a closed position to deny access to said compartment to said animal, and configured to reside in an open position to grant access to said compartment to said animal; and
a plurality of moat assemblies coupled to said case so as to inhibit said crawling arthropods from gaining access to said food.

19. An animal-actuated feeder as claimed in claim 18 wherein each of said moat assemblies comprises:
a moat having a base and a peripheral containing wall coupled together and configured to contain a medium serving to inhibit a passage of said crawling arthropods;
a support post coupled to said moat and said case, configured to be surrounded by said arthropod-inhibiting medium, and configured to serve as at least one leg of said feeder; and
a moat cover removably coupled to said moat at a first predetermined distance from said case, having an outer periphery removably coupled to said peripheral containing wall, and having an inner periphery separated from said support post by a second predetermined distance.

20. An animal-actuated feeder as claimed in claim 19 wherein:
said inhibiting medium comprises one of a liquid and a powder; and
said moat cover is configured to inhibit spillage of said medium and, if said medium is a liquid, to retard evaporation of said medium.

21. An animal-actuated feeder as claimed in claim 19 wherein each of said moat assemblies additionally comprises a baffle coupled to said support post and having an outer periphery separated from an inner surface of said peripheral containing wall by a third predetermined distance.

22. An animal-actuated feeder as claimed in claim 18 wherein each of said moat assemblies comprises:
a moat configured to contain said arthropod-inhibiting medium;
a moat cover coupled to said moat;
a support post coupled to said moat; and
a baffle coupled to said support post, wherein said moat cover and said baffle together are configured to inhibit access to said medium by said animal.

23. An animal-actuated feeder as claimed in claim 18 wherein:
said feeder additionally comprises a treadle coupled to said case and configured to be tread upon by said animal;

said cover is configured to transit from said closed position to said open position when said treadle is tread upon by said animal.

24. An animal feeding system having at least one animal-actuated feeder, wherein said one feeder comprises:
   a case;
   a treadle coupled to said case and configured to be tread upon by an animal desirous of obtaining food;
   a compartment formed within said case and configured to contain said food;
   a cover coupled to said compartment and said treadle, configured to reside in a closed position in which access to said compartment is denied to said animal, configured to reside in an open position in which access to said compartment is granted to said animal, and configured to transit from said closed position to said open position when said treadle is tread upon by said animal and said cover is not inhibited from transiting from said closed position to said open position;
   a latch coupled to said cover and configured to inhibit said cover from transiting from said closed position to said open position until said latch is released, wherein said cover is configured to transit from said closed position to said open position when said latch is released and said treadle is tread upon by said animal; and
   a control unit coupled to said latch and configured to release said latch.

25. An animal feeding system as claimed in claim 24 wherein said one feeder additionally comprises:
   a tag unit configured to be carried by said animal and containing a passive electronic circuit; and
   a sensor coupled to said control unit and configured to sense when said animal carrying said tag unit treads upon said treadle, wherein said control unit is configured to release said latch when said sensor detects said tag unit.

26. An animal feeding system as claimed in claim 25 wherein:
   said sensor is configured to radiate an electromagnetic field at a predetermined frequency; and
   said passive electronic circuit within said tag unit is configured to be responsive to said predetermined frequency.

27. An animal feeding system as claimed in claim 25 wherein:
   said passive electronic circuit within said tag unit is configured to be absorptive of an electromagnetic field at a predetermined frequency; and
   said sensor is configured to radiate said electromagnetic field at said predetermined frequency.

28. An animal feeding system as claimed in claim 24 wherein said one feeder additionally comprises:
   a tag unit configured to be carried by said animal and containing a passive electronic circuit configured to be responsive to a predetermined frequency; and
   a sensor coupled to said control unit, configured to radiate an electromagnetic field proximate said treadle at said predetermined frequency, and configured to sense when said animal carrying said tag unit enters said electromagnetic field and treads upon said treadle, wherein said control unit is configured to release said latch when said sensor detects said tag unit, and wherein said cover is configured to transit from said closed position to said open position when said treadle is tread upon by said animal and said latch is released.

29. An animal feeding system as claimed in claim 28 wherein:
   said animal is one of a plurality of animals;
   said one feeder is one of a plurality of said feeders;
   said predetermined frequency is one of a plurality of predetermined frequencies;
   said tag unit for each of said plurality of feeders is configured to be carried by one of said plurality of animals, and said passive electronic circuit contained within said tag unit is configured to be responsive to one of said plurality of predetermined frequencies; and
   said sensor in one of said plurality of feeders is configured to radiate said electromagnetic field at said one predetermined frequency, and configured to sense when said one animal carrying said one tag unit enters said electromagnetic field radiating at said one predetermine frequency and said one animal treads upon said treadle.

30. An animal feeding system as claimed in claim 24 wherein said control unit in said one feeder is configured to release said latch at a predetermined time; and
   said cover is configured to transit from said closed position to said open position when said treadle is tread upon by said animal after said predetermined time.

31. An animal feeding system as claimed in claim 24 wherein said one feeder additionally comprises a damper coupled to said cover and configured to dampen transit between said open position and said closed position.

32. An animal feeding system as claimed in claim 24 wherein said cover of said one feeder is configured so that a front edge thereof does not vertically rise above a rear edge thereof as said cover transits from said closed position to said open position.

33. An animal feeding system as claimed in claim 24 wherein:
   said food contained in said compartment of said one feeder is a lesser quantity of said food; and
   said one feeder additionally comprises a hopper coupled to said compartment, configured to house a greater quantity of said food, and configured to supply portions of said greater quantity of said food into said compartment to maintain said lesser quantity of said food within said compartment.

34. An animal feeding system as claimed in claim 24 wherein said one feeder additionally comprises a spring coupling said treadle to said cover substantially along a centerline of said treadle and configured to inhibit damage to said feeder when said treadle is tread upon by said animal and said cover is inhibited from transiting from said closed position to said open position.

35. An animal feeding system as claimed in claim 24 wherein said one feeder additionally comprises a plurality of moat assemblies coupled to said case, wherein each of said moat assemblies has a moat configured to contain a medium serving to inhibit a passage of crawling arthropods, a support post coupled between said moat and said case and configured to be surrounded by said arthropod-inhibiting medium, and a cover removably coupled to said moat.

* * * * *